Dec. 11, 1962 H. FAURE 3,067,595
HOMOKINETIC UNIVERSAL JOINT
Filed Oct. 16, 1961 2 Sheets-Sheet 1
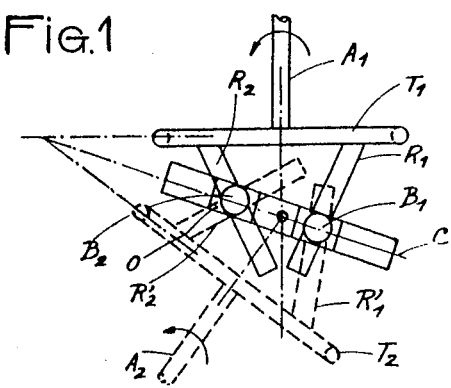
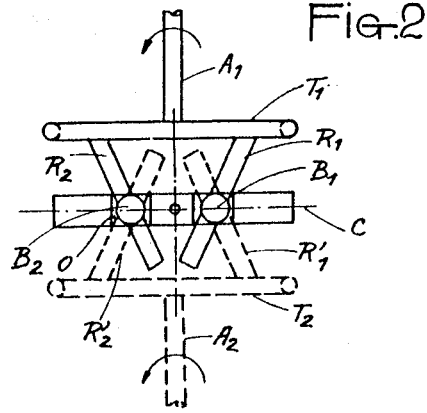
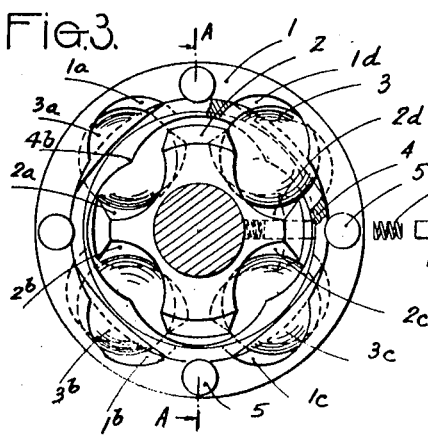
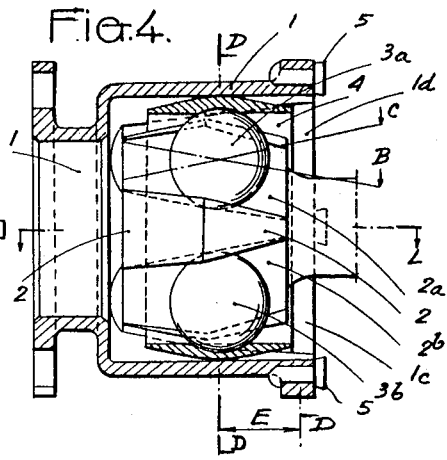
INVENTOR
Henry Faure
BY Karl W. Flocks
ATTORNEY Dec. 11, 1962     H. FAURE     3,067,595
HOMOKINETIC UNIVERSAL JOINT
Filed Oct. 16, 1961     2 Sheets-Sheet 2
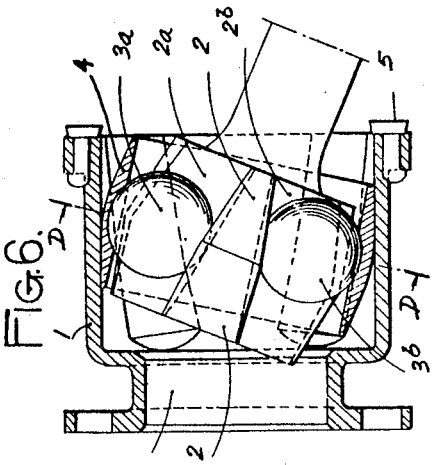
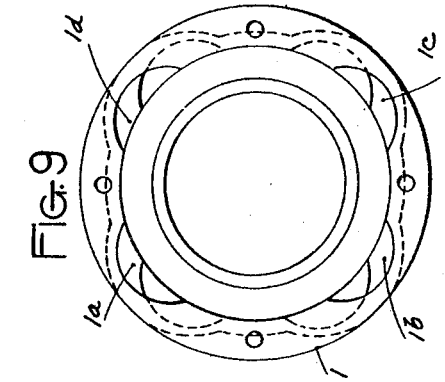
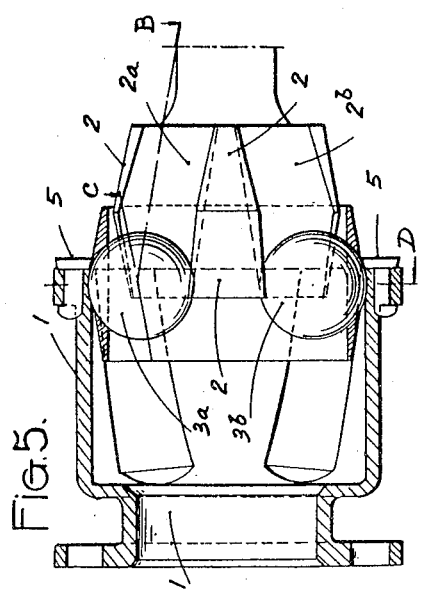
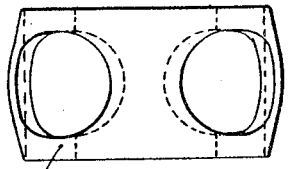
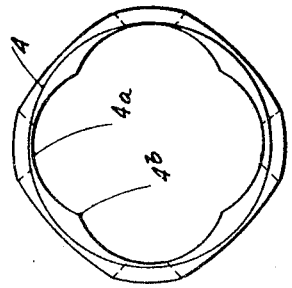
INVENTOR
Henry Faure
BY Karl W. Flocks
ATTORNEY United States Patent Office 3,067,595
Patented Dec. 11, 1962

3,067,595
HOMOKINETIC UNIVERSAL JOINT
Henry Faure, 13 Rue de Balzac, Saint-Etienne,
Loire, France
Filed Oct. 16, 1961, Ser. No. 147,125
Claims priority, application France Feb. 2, 1961
4 Claims. (Cl. 64—8)

The present invention relates to a universal ball joint of the integral diametral drive type.

Many universal ball-joints exist, but they have one or more of the following drawbacks:

They are not rigorously homokinetic;
Their operation is not symmetric, whereby the balls and their races wear unequally,
They include many parts which are difficult to machine or to mount.

The present invention relates to a joint having none of the aforesaid drawbacks in the sense that it is rigorously homokinetic; that the wear of the balls and the races is rigorously symmetric; that the components thereof are easy to machine, are of limited number and of ready assembly; that, finally, it has the advantage of being noiseless.

The joint according to the invention is of the type wherein a torque is transmitted between two heads, male and female, by means of balls engaged within races, an intermediate cage providing the lateral link-up of these balls.

This joint is characterised essentially by the fact that the female head has a cylindrical internal surface of revolution; the male head has a convex biconic external surface of revolution; the intermediate cage has an external surface of revolution of which the meridian is constituted by an arc of a circle extended by two straight portions in such a manner that this cage can swing and slide in the cylindrical portion of the female head.

The races of the same head are even in number and successively and alternately inclined by the same positive or negative angle with respect to the axis of revolution of the head under consideration, each of the races of the other head being inclined in the inverse direction to that of the race with which it co-operates.

Other features and advantages of the present invention will become clear from the following descripiton in connection with the accompanying drawings giving, merely by way of explanation and without any intention of limitation, various embodiments of the invention.

In the drawings:

FIGURES 1 and 2 represent the general working diagram, in two different positions, of a joint whose races are alternately inclined in one direction and the other, for each head;

FIGURE 3 is a part-sectional front view of one embodiment of a joint according to the invention;

FIGURE 4 is a side view of the same joint, the outer head and the cage being shown in section;

FIGURE 5 is a side view of the same joint, the longitudinal position of the heads having varied with respect to that shown in FIGURE 4;

FIGURE 6 is a side view of the same joint, the heads being shown in the maximum angular position;

FIGURE 7 is a front view of the ball cage of the same joint;

FIGURE 8 is a side view of the same cage; and

FIGURE 9 is a front view of the outer head of the same joint.

In FIGURES 1 and 2 are illustrated the geometrical diagrams of a joint according to the invention in two different positions, which show how the balls and the cage are restricted to a constant position in the bisecting plane, by orienting inversely on each head each of the races housing a ball, in such a way that the latter is subjected to "scissoring" in the bisecting plane.

In these figures:

A1, A2 are the two axes of rotation,
T1, T2 are the two heads;
R1, R2, R'1, R'2 are the races distributed over the periphery of each of the heads,
C is the track of the cage of which O represents the oblong slots,
B1, B2 are the balls.

It can be seen in these figures that on the same head the adjacent races R1, R2 are of alternate inclination. The same is true for the races R'1, R'2 of the opposed head, but the various races confronting one another are inversed in pairs. FIGURE 1 illustrates the diagram wherein the two axes A1, A2 are extensions of each other, whereas in FIGURE 2 these axes form a certain angle. It can accordingly be seen that the track of the medial plane C of the cage always coincides with the bisecting plane, as the balls cannot have any lateral displacement in the slots.

FIGURES 3 to 9 illustrate a preferred embodiment of the joint according to the invention, wherein the heads 1 and 2 can slide longitudinally relative to each other. The outer head 1 is cylindrically hollowed-out and provided with four rectilinear races 1a, 1b, 1c and 1d of semi-circular cross-section; seen from the side (in projection) the outermost races are substantially parallel to the axis $L/L$ but the innermost races are at angles to axis $L/L$ as indicated by $B/C$. The inner head 2 is provided with four races 2a, 2b, 2c and 2d of the same angularity but inversed with respect to that of their corresponding races in head 1. All of these races intersect one another, strictly viewed in plan, at the geometric centre of the joint, irrespective of the relative longitudinal position of one head with respect to the other.

Moreover, the angle of each race of head 1 is inverted with respect to the angle of its adjacent races, and the same for the races of head 2.

Balls, 3, 3a, 3b and 3c are housed in their corresponding races and extend through a cage 4 having slots circumferentially formed therein to maintain the assembly of balls in the same lateral plane but allowing them to play in proportion to the maximum angular work required of the joint.

In the angular operation of the joint, one section of each of the balls is urged away from one side of the bisecting plane $D/D$, while the diametrically opposite section of each ball is urged away from the other side, and there is therefore consistent balancing of the cage 4 about the geometric centre of the joint, irrespective of the relative longitudinal position E of heads 1 and 2, the "scissoring" at $B/C$ taking place in the normal way for all longitudinal as well as all angular positions of the heads, exactly in the bisecting plane $D/D$.

In the angular operation and in the longitudinal operation of the joint, the cage 4 is caused to oscillate and to slide in the cylindrical interior of the head 1. To this end, the diametral part of cage 4 is spherical at the top (FIGURES 6 and 8), and thereafter inclined by an angle determined by the maximum play required. The cage 4 contacts the outer head 1 but is not in contact with the inner head 2 around which it plays freely.

The centering of the head 2 is with respect to the balls and, in order to increase its bulk and consequently increase the bearing of the races on the balls, four relieved portions 4a are provided in the cage 4 (FIGURE 7) whose points of intersection 4b are outwith the central point of the balls in order to ensure their correct lateral guiding.

This arrangement further enables the diameter of the male head 2 to be increased, and consequently the bearing of the balls 3 to be increased also.

The pin 7 pushed by the spring 6 (FIGURE 3) against one of the relieved portions (FIGURE 7) of cage 4, centres relatively this latter in order to prevent the balls from abutting the bottoms of the slots during maximum angular operation of the joint. A plurality of springs 6 and pins 7 can be applied to the head 2.

The assembly of the joint components is effected by bringing these components into a confronting relationship and thereafter engaging them into one another. In order to prevent separation of the components in handling after assembly, four rivets 5 are provided, the conical heads of which lock the cage 4 in the head 1 (see FIGURE 5).

The operation having been described above, it will be seen that the balls enable constant equilibrium to be obtained, thus ensuring equal wear for all the balls.

It will be seen from the figures and the foregoing description that the number of parts required to form such a joint is relatively small when compared with that required for known ball joints and, above all, that their machining is less costly.

The scope of the invention is not exceeded by using equivalent means to form a homokinetic joint comprising the combination of two heads, male and female, having races subjecting the balls to "scissoring," and an intermediate cage provided with elongated peripheral orifices or slots for the balls, these orifices being such that only peripheral displacement of the balls is possible.

Thus, for example,

One of the shafts or both shafts can be removable from their respective heads;

The arrangement for securing the inner head onto its shaft can be of any type whatever;

The inner and outer profiles of the heads and cages can be of any design whatever provided that the friction surfaces be of revolution and conjugated;

The races can have a semi-circular cross-section of any diameter, provided that these diameters are adapted to the diameters of the balls or vice versa;

Casings in metal or in a flexible material can be provided to hold the lubricant in the components of the joint;

The races can be inclined by any angle, both on the diametral plane and in the longitudinal direction, provided that, as a function of the diameter of the balls, sufficient "scissoring" effect be obtained, and provided that two opposite races on the two opposite heads "scissoring" the same ball be symmetrically inclined in the inverse direction to each other;

The materials used for the various components can be of any desired type, as long as they are adapted to roll well and have little wear;

The renovation of these joints is easy since it suffices merely to rectify the races and to replace the balls.

I claim:

1. Extensible homokinetic universal joint comprising, in combination, a female head having a cylindrical internal surface of revolution, an even number of ball races formed in said internal surface, said races being uniformly distributed and inclined successively and alternately by the same angle with respect to the axis of revolution of said cylindrical internal surface, a male head having a biconical convex outer surface of revolution, ball races formed in said outer surface, there being as many of said races in said outer surface as there are in said female head, each of said races in said outer surface being inclined in the direction inverse to that of the race in said female head with which it is adapted to co-operate, a plurality of balls, said plurality being equal in number to the number of said ball races, each of said balls being engaged simultaneously with a ball race of said male head and with a corresponding ball race of said female head, said balls being adapted to transmit a mechanical couple between said male and female heads, and an intermediate cage having an external surface of revolution whose meridian comprises an arc of a circle extended by two straight lines adapted to be rockable and slideable in the cylindrical portion of said female head, said intermediate cage being provided with as many slots of oblong shape as there are said balls, said slots being adapted to house said balls.

2. Extensible homokinetic joint according to claim 1, wherein each ball race is rectilinear, of semi-circular section, and is inclined by a particular angle with respect to that diametral plane of symmetry of the surface of revolution of the head in which it is situated from which it is the most remote.

3. Extensible homokinetic joint in accordance with claim 1, wherein said intermediate cage is provided with as many relieved portions as there are said balls in number, the points of mergence between said relieved portions being situated at a constant distance which is less than that at which the centers of said balls are located from said geometric center.

4. Extensible homokinetic joint according to claim 1, wherein said intermediate cage is adapted to be centered in the direction of rotation with respect to said balls by the thrust imparted thereto by at least one resiliently biased pin housed in said male head.

References Cited in the file of this patent

UNITED STATES PATENTS

| | | |
|---|---|---|
| 2,047,660 | Anderson | July 14, 1936 |
| 2,309,939 | Dodge | Feb. 2, 1943 |
| 2,319,100 | Anderson | May 11, 1943 |
| 3,002,364 | Bellomo | Oct. 3, 1961 |